M. L. ORUM.
Device for Bending Metal Pipes.
No. 166,293. Patented Aug. 3, 1875.
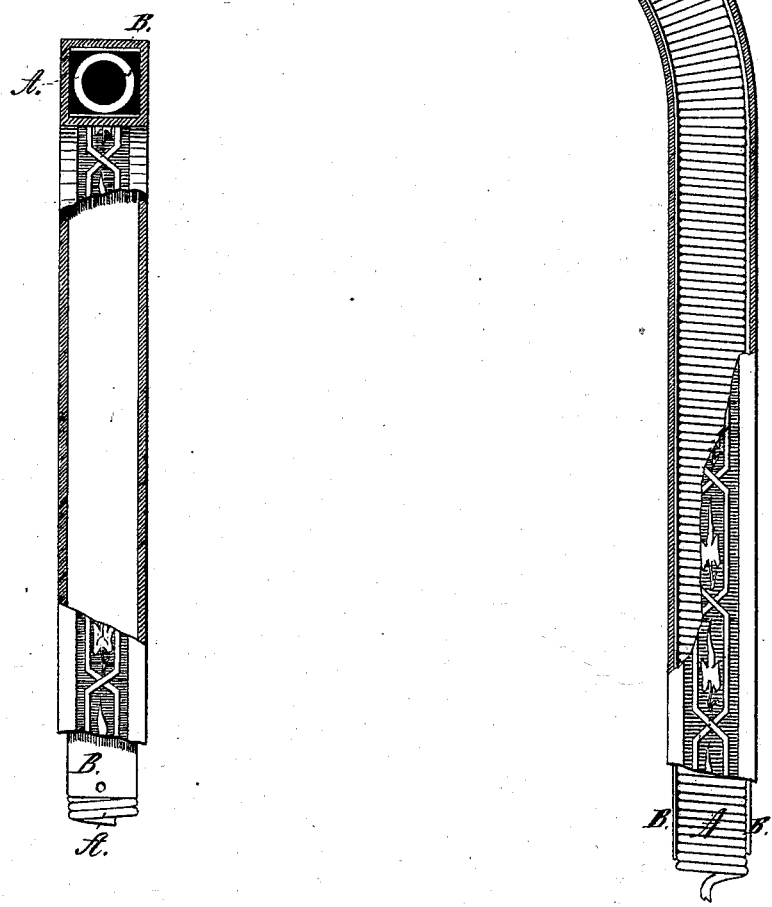

UNITED STATES PATENT OFFICE.

MORRIS L. ORUM, OF PHILADELPHIA, PENNSYLVANIA.

IMPROVEMENT IN DEVICES FOR BENDING METAL PIPES.

Specification forming part of Letters Patent No. 166,293, dated August 3, 1875; application filed May 22, 1875.

*To all whom it may concern:*

Be it known that I, MORRIS L. ORUM, of the city and county of Philadelphia, in the State of Pennsylvania, have invented a certain new and useful Device for Bending Metal Pipe, of which the following is a specification:

My invention is designed for bending metal pipes of square or polygonal section, such as are used in the manufacture of gas-fixtures, &c.; and my improvement consists in combining a flexible mandrel, composed of a coil of spiral wire, and flexible plates interposed between the mandrel and the inner surfaces of the pipe, as hereinafter more fully set forth.

In the accompanying drawings, Figure 1 is a side view, partly in section, of a pipe with my improvement applied thereto; and Fig. 2, a similar view taken at right angles to Fig. 1.

To carry out the object of my invention, I provide a flexible mandrel, A, which is formed of a spiral coil of stout wire, of such diameter as to fit easily between two thin plates of flexible metal, B B, interposed between the coil and the inner surfaces of the pipe, upon the two sides of the latter, which are at right angles to the radius of the curve to be formed. Round, square, or flattened wire may be used to form the mandrel, and the thickness of the plates B B should be sufficient to prevent them from being indented or fractured in the bending operation, without rendering them so stiff as to oppose an undue resistance thereto. Their width should be somewhat less than that of the pipe, so that they may be readily inserted and withdrawn.

In the application of my improved device, the mandrel and plates are introduced into the pipe before commencing to bend it. It is then bent to the curvature required by the ordinary implements, and the mandrel and plates are then withdrawn. The flexible mandrel acts as a support to the sides of the pipe in the operation, and prevents them from being indented or injured, and the office of the plates B B, the sections of which are tangential to that of the mandrel, is to afford a bearing for the pipe thereon for the entire width of the pipe, instead of at single points, as would be the case if the plates were not employed. I have found by experiment that short bends can be readily and expeditiously formed upon square pipes by the use of my improvement, which is, of course, equally applicable to pipes of other polygonal section.

I am aware that a flexible mandrel for bending metal pipe, consisting of a spiral coil of wire, has been heretofore proposed, and Letters Patent of the United States for one form of such have been allowed to me May 3, 1875. I do not, therefore, broadly claim a flexible mandrel; but

What I claim as my invention is—

In a device for bending metal pipe, the combination of a spiral-wire mandrel and flexible plates interposed between the mandrel and the sides of the pipe, substantially as set forth.

MORRIS L. ORUM.

Witnesses:
J. SNOWDEN BELL,
C. H. MELLOR.